United States Patent
Lin et al.

(10) Patent No.: US 8,981,615 B2
(45) Date of Patent: Mar. 17, 2015

(54) WOUND STATOR CORE

(71) Applicant: Industrial Technology Research Institute, Hsin-Chu (TW)

(72) Inventors: Cheng-Hsuan Lin, Taoyuan County (TW); Wen-Yang Peng, Hsinchu County (TW); Han-Ping Yang, Hsinchu (TW); Jung-Kang Peng, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 310 days.

(21) Appl. No.: 13/742,656

(22) Filed: Jan. 16, 2013

(65) Prior Publication Data

US 2014/0111059 A1    Apr. 24, 2014

(30) Foreign Application Priority Data

Oct. 19, 2012   (TW) .............................. 101138645 A (51) Int. Cl.
  *H02K 1/00*   (2006.01)
  *H02K 1/14*   (2006.01)
  *H02K 1/16*   (2006.01)
  *H02K 15/02*  (2006.01)

(52) U.S. Cl.
  CPC .................. *H02K 1/146* (2013.01); *H02K 1/16* (2013.01); *H02K 15/026* (2013.01)
  USPC ....... 310/216.001; 310/216.004; 310/216.008

(58) Field of Classification Search
  USPC .................................. 310/216.001–216.013, 310/216.025–216.041
  See application file for complete search history.

(56) References Cited

U.S. PATENT DOCUMENTS

| | | | | |
|---|---|---|---|---|
| 3,069,577 A | * | 12/1962 | Lee | 310/166 |
| 3,206,962 A | | 9/1965 | Buralli | |
| 3,581,389 A | * | 6/1971 | Mori et al. | 29/598 |
| 3,708,706 A | * | 1/1973 | Akiyama et al. | 310/216.041 |
| 4,187,441 A | * | 2/1980 | Oney | 310/112 |

(Continued)

FOREIGN PATENT DOCUMENTS

| CN | 1725605 A | 1/2006 |
|---|---|---|
| CN | 102736437 A | 10/2012 |

(Continued)

OTHER PUBLICATIONS

Yamazaki; et al., "Eddy Current Analysis Considering Lamination for Stator Core Ends of Turbine Generators", Jun. 2008, pp. 1502-1505, vol. 44, No. 6, IEEE Transactions on Magnetics.

(Continued)

*Primary Examiner* — Thanh Lam
(74) *Attorney, Agent, or Firm* — WPAT, PC; Justin King (57) ABSTRACT

A wound stator core disclosed is substantially formed from a spirally piled strip. In an embodiment, the strip with a specific length is formed with a first dentition and a second dentition, whereas the first dentition is featured by a first slot-number ratio and is composed of a first side and a plurality of first teeth in a manner that the plural first teeth are arranged as an array on the first side; which is also same to the second dentition while allowing the second slot-number ratio to be equal to the first slot-number ratio. In addition, each first tooth is formed with a first dental part at a free end thereof, while also each second tooth is formed with a second dental part at a free end thereof, and the first dental part of each first tooth is connected to the second dental part of its corresponding second tooth.

10 Claims, 8 Drawing Sheets

(56) References Cited

U.S. PATENT DOCUMENTS

| | | | |
|---|---|---|---|
| 4,356,377 A | 10/1982 | Norton et al. | |
| 4,363,988 A | 12/1982 | Kliman | |
| 4,364,169 A * | 12/1982 | Kawano et al. | 29/596 |
| 4,410,820 A | 10/1983 | Stanley | |
| 4,796,179 A | 1/1989 | Lehman et al. | |
| 4,796,451 A * | 1/1989 | Fritzsche | 72/131 |
| 4,914,934 A * | 4/1990 | Fritzsche | 72/135 |
| 4,922,143 A * | 5/1990 | Gosdowski et al. | 310/12.27 |
| 5,831,366 A | 11/1998 | Kern et al. | |
| 6,147,431 A * | 11/2000 | Asao et al. | 310/216.004 |
| 7,010,846 B2 | 3/2006 | Nakamura | |

FOREIGN PATENT DOCUMENTS

| | | |
|---|---|---|
| EP | 0046310 A1 | 2/1982 |
| JP | 2001-136721 A | 5/2001 |
| TW | 427043 | 3/2001 |
| TW | M397619 | 2/2011 |
| TW | 201223082 A | 6/2012 |
| WO | 2012046408 | 4/2012 |

OTHER PUBLICATIONS

Jack; et al., "Axial Flux Motors Using Compacted Insulated Iron Powder and Laminations—Design and Test Results", 2005, pp. 378-385, IEEE.

Gramatyka; et al., "Soft magnetic composite based on nanocrystalline Fe73.5Cu1Nb3Si13.5B9 and Fe powders", Mar.-Apr. 2006, pp. 27-31, vol. 15, International OCSCO World Press.

Lamprecht; et al., "Fundamental Investigations of Eddy Current Losses in Laminated Stator Cores Created Through the Impact of Manufacturing Processes", 2011, pp. 29-35, IEEE.

Noguchi; et al., "Development of Dy-free NdFeB Anisotropic Bonded Magnet (New MAGFINE)", 2011, pp. 181-186, IEEE.

Taiwan Patent Office "Office Action", May 20, 2014.

* cited by examiner

WOUND STATOR CORE

CROSS REFERENCE TO RELATED APPLICATION

This application also claims priority to Taiwan Patent Application No. 101138645 filed in the Taiwan Patent Office on Oct. 19, 2012, the entire content of which is incorporated herein by reference.

TECHNICAL FIELD

The present disclosure relates to a wound stator core, and more particularly, to a stator core designed for allowing two stators to be wound and formed simultaneously.

BACKGROUND

The basic design concept about axial flux motors had been around for more than a century, in which the axial flux motor with a stator core that is made of a magnetic conductive material is the motor most often being adapted for applications requiring direct drive and large torque since it has comparatively larger air-gap flux density for achieving higher torque density more easily. However, three are still many technical difficulties to be resolved just to be able to use common silicon steel for manufacturing stator cores for axial flux motors in mass production. One major technical difficulty is that: during the making of a stator core out of a silicon steel strip, since the silicon steel strip is being stamped with teeth and slots and the same time is being spirally wound, the spiral winding and the teeth stamping must be coordinated and controlled accurately for allowing teeth and slots to be formed with continuously varying pitches, and thereby, enabling those teeth or slots of different layers to be aligned with one another precisely so as to ensure a good slot straightness. Thus, a stator core with good slot straightness not only can ensure a specific slot fill factor to be maintained, but also it is helpful for allowing a pre-wound coil to mount smoothly onto its corresponding slot.

In addition, for reducing clogging in permanent-magnet axial-flux motors with wound stator core and/or for decreasing harmonic ratio in power generators, generally the air-gap flux density distribution is required to be adjusted for enabling the waveform of the corresponding counter electromotive force to resemble a sine wave or decreasing the harmonics, and that adjustment is usually achieved by modifying the top profiles of the teeth in the stator as each tooth is treated and acted as a magnet. Generally, in all the current methods for manufacturing wound stator core for axial-flux motors, there is never a step designed for modifying the top profiles of the teeth in the wound stator core, but instead, the top profiles of the teeth are modified and adjusted by an additional grinding process that is performed after the whole spirally winding of the stator core is completed. However, the use of the additional grinding process for cutting and removing excess materials from each tooth so as to shape the top profiles of the teeth into required shapes can be disadvantageous in that: in addition to the increase in material loss, the additional grinding process is going to cost more in energy consumption and work hour. Thus, a feasible mass production method for manufacturing high-torque direct-drive axial-flux motors is a method that can reduce the amount of waste material to be generated, reduce the amount of process required to be performed for making a stator core, and increase the rate of production, while the same time allowing teeth of various top characteristics to be formed as desire at will.

In order to fully utilize the available space inside the slim-type motor while also improve its operation efficiency, the design as well as the method of using electrical steel to manufacture stators is one of the key factors. Since most motors are primarily made of electrical steel and copper wires which together can take up more than 40% of the their manufacture cost, how to balance between cost and operation efficiency is an importance issue to be considered in stator design and development. Notably, the major energy losses in stator core are iron loss and stray loss, which are closely related to the material characteristic of the electrical steel used for building the stator, the stator size and also the process accuracy for making the stator. Generally, early stators and rotors are made directly from a block of steel, and then with the improvement of technology, they are formed by lamination of steel sheets. Nevertheless, no matter they are formed by the processing of a block of steel or by lamination of steel sheets, the common drawbacks in the two processes are high energy consumption, high material loss and limited by one-time operation. Nowadays, most stators are formed by a means of continuous lamination, using which a silicon steel strip is being stamped continuously and the same time is being spirally wound into a stator core. Such stator cores of continuous lamination had been used in many radial-flux motors by major motor manufacturers in Europe, America and Japan, and are also becoming more and more common in axial-flux motors. However, since the stray loss as well as motor noise are directly related to the compactness of the stator lamination, the winding tightness and alignment accuracy in the spirally winding process are keys to build a good stator core.

In addition, the other means of adopting high-grade silicon steel sheet with reduced thickness in a process of high machining accuracy and optimal design is also effective for achieving a good stator core with low stray loss and low noise. However, not to mention that the high-grade silicon steel sheet with low stray loss is generally very expensive, the current process for stamping and spirally winding such high-grade silicon steel sheet is a process of high energy consumption and high material consumption. Although the use of silicon steel sheet with reduced thickness can effectively reduce the amount of material wasted in the machining process, the material strength of such thin silicon steel sheet is generally not sufficient enough that certain deformations such as curling deformation to the teeth of stator lamination can be caused during the stamping of the silicon steel sheet. Responsively, for solving such deformation caused by insufficient strength, one method is to attach an addition metal strip to the flat side of the teeth tops in the stator lamination to be used as connection anchor, but it is going to cause more material cost and difficulty in machining. On the other hand, there is another method that can effectively solve the aforesaid deformation problems by stamping teeth and slots in a stator lamination in an alternating manner, but it is disadvantageous in that: the shape of the teeth and slots to be formed in the stator lamination as well as the available space in the stator lamination will further be limited by the alternating design.

Moreover, as the defect rate of stators formed from a spirally winding process is generally high that not only the defective work loss is high, but also the overall production time is prolonged. In addition, although the stators formed from a spirally winding process can be manufactured using a punch stamping press with smaller press tonnage and thus the energy loss in the stamping can be reduced, but the number of punch stamping required for forming just one stator is much more than those stators not formed by a spirally winding process and thus the percentage of wear-and tear to the punch head is higher.

SUMMARY

The present disclosure relates to a wound stator core designed for allowing two stators to be wound and formed simultaneously.

In an embodiment, the present disclosure provides a wound stator core, which is substantially formed from a spirally piled strip with a specific length. In addition, the strip is formed with a first dentition and a second dentition, whereas the first dentition is featured by a first slot-number ratio and is composed of a first side and a plurality of first teeth in a manner that the plural first teeth are arranged as an array on the first side; and similarly, the second dentition is featured by a second slot-number ratio and is composed of a second side and a plurality of second teeth in a manner that the plural second teeth are arranged as an array on the second side; and the second slot-number ratio is equal to the first slot-number ratio. Moreover, each first tooth is formed with a first dental part at an end thereof opposite to the end thereof that is connected to the first side, while similarly each second tooth is formed with a second dental part at an end thereof opposite to the end thereof that is connected to the first side, and thereby, since the plural first teeth are arranged corresponding to the plural second teeth in a one-by-one manner, each first tooth is connected to the second dental part of its corresponding second tooth by the first dental part thereof.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
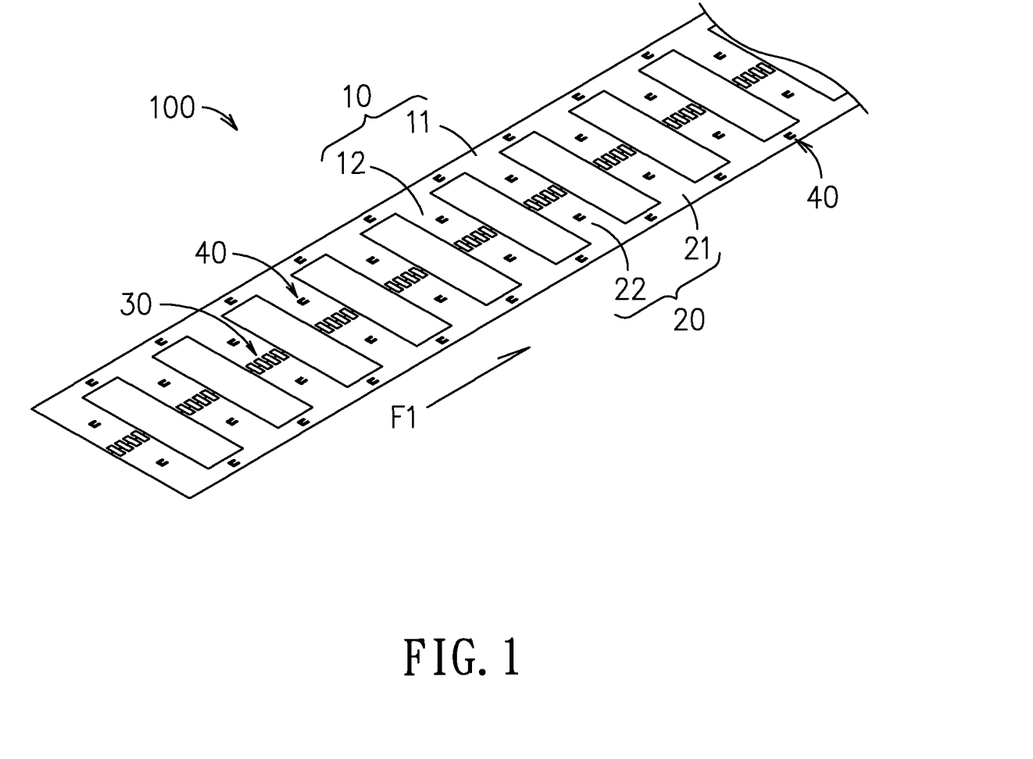
FIG. 1 is a three-dimensional diagram showing a thin strip that is to be spirally wound into a stator core according to an embodiment of the invention.
Figure 2:
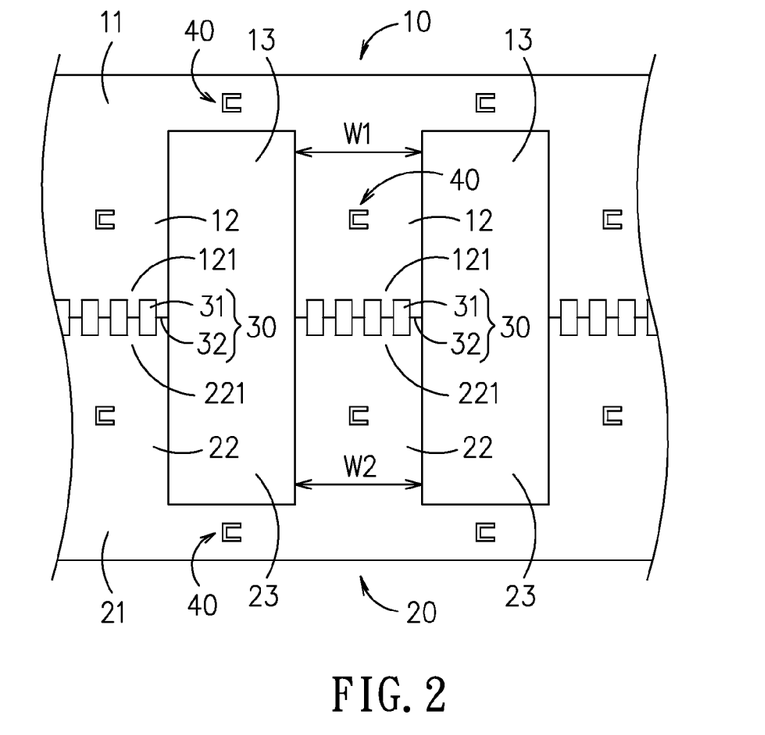
FIG. 2 is a partially enlarged view of the thin strip shown in FIG. 1.

Please refer to FIG. 1 and FIG. 2, which are schematic diagrams showing a thin strip that is to be spirally wound into a stator core according to an embodiment of the invention. As shown in FIG. 1 and FIG. 2, the strip 100 is substantially an electric magnetic steel sheet of a specific length that is extending in a longitudinal length parallel to a first direction F1, and is formed with a first dentition 10 and a second dentition 20.

Moreover, the first dentition 10, being featured by a first slot-number ratio; is composed of a first side 11 and a plurality of first teeth 12, whereas the first side 11 is a bar extending in its longitudinal direction that is arranged parallel to the first direction F1 and the plural first teeth 12 are arranged as an array on the first side 11. In this embodiment, each of the plural first teeth 12 is formed with a first width W1, and for any two neighboring first teeth 12, there is a slot 13 formed therebetween. Moreover, each first tooth 12 is formed with a first dental part 121 at an end thereof opposite to the end thereof that is connected to the first side 11. Similarly, the second dentition 20, being featured by a second slot-number ratio; is composed of a second side 21 and a plurality of second teeth 22, whereas the second side 21 is a bar extending in its longitudinal direction that is arranged parallel to the first direction F1, i.e. the first side 11 and the second side 21 are arranged parallel to each other; and the plural second teeth 22 are arranged as an array on the second side 21. In this embodiment, each of the plural second teeth 22 is formed with a second width W2, and for any two neighboring second teeth 22, there is a slot 23 formed therebetween. Moreover, each second tooth 21 is formed with a second dental part 221 at an end thereof opposite to the end thereof that is connected to the second side 21. Since the second slot-number ratio is equal to the first slot-number ratio, and accordingly the plural first teeth 12 are arranged corresponding to the plural second teeth 21 in a one-by-one manner, each first tooth 12 is connected to the second dental part 221 of its corresponding second tooth 21 by the first dental part 121 thereof. In this embodiment, the first dentition 10 and the second dentition 20 are symmetrically arranged with respect to each other, i.e. the first width W1 is equal to the second width W2.

Figure 3:
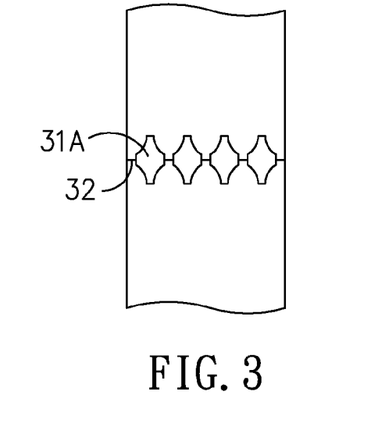
FIG. 3 and FIG. 4 are schematic diagrams showing various connection structures used in the present disclosure.
Figure 4:
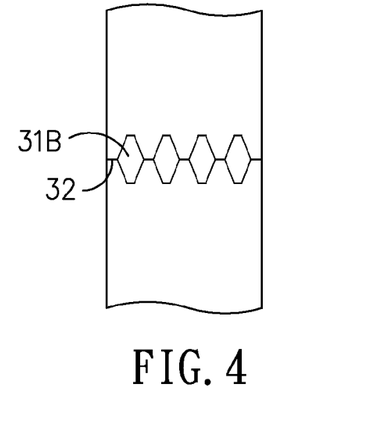

The strip 100 of the present disclosure further comprises: a plurality of connection structures 30, whereas each of the plural connection structures 30 is formed at a position between one of the plural first dental parts 121 and its corresponding second dental part 221 that is connected thereto, and each connection structure 30 is composed of a plurality of first hollow parts 31 that are arranged in an array parallel to the longitudinal direction F1 of the strip 100. In addition, the strip 100 further comprises: an indentation lines 32, that is formed extending in a longitudinal direction parallel to the longitudinal direction F1 of the strip 100 while passing through the centers of all the plural first hollow parts 31. In this embodiment, each of the first hollow part 31 is formed in a rectangle shape, but is not limited thereby that it can be formed in various shapes, such as the diamond shaped first hollow parts 31A and 31B shown respectively in FIG. 3 and FIG. 4. Similarly, in the embodiments shown in FIG. 3 and FIG. 4, there is also an indentation line 32 being formed passing through the joints between the first dental parts 121 and their corresponding second dental parts 221 while simultaneously passing through the centers of all the plural diamond-shaped first hollow parts 31A and 31B. It is noted that although each of the foregoing first hollow parts 31, 31A and 31B is constructed in a shape symmetrically with respect to the indentation line 32, such first hollow parts 31, 31A and 31B can be formed asymmetrically as required.

Figure 7:
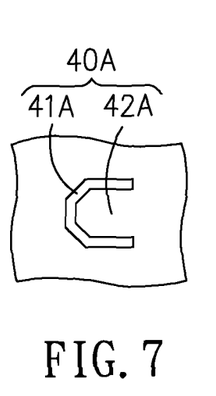
FIG. 7 to FIG. 9 are schematic diagrams showing various exemplary alignment structures used in the present disclosure
Figure 8:
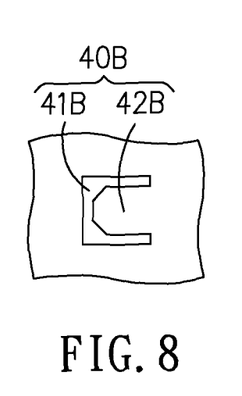
Figure 9:
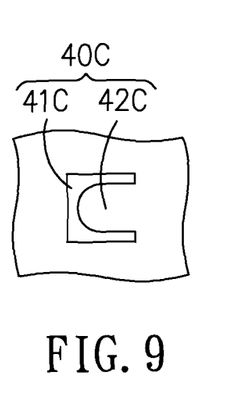

As shown in FIG. 1, FIG. 2, FIG. 5 and FIG. 6, the strip 100 is formed with a plurality of alignment structures 40, and each of the plural alignment structures 40 is composed of a second hollow part 41 and a tongue piece 42, whereas the second hollow part 41 is formed partially or completely boring through the strip 100. In this embodiment, the second hollow part 41 is formed completely boring through the strip 100, while allowing the tongue piece 42 to be disposed and hang inside the second hollow part 41. In addition, the tongue piece 42 is formed with a connect side 421 and a free side 422 that are opposite to each other, to be used for allowing the tongue piece 42 to connect to the strip 100 via the connect side 421 while enabling the free side 422 to hang and stick out of one surface of the strip 100, i.e. the bottom of the strip 100 in this embodiment, and thus enabling an included angle θ to be formed between the tongue piece 42 and the strip 100. In this embodiment, both the second hollow part 41 and the tongue piece 42 are formed respectively as a rectangle, but they are not limited thereby and thus can be formed in other shapes, as those embodiments shown in FIG. 7 to FIG. 9. In the alignment structure 40A shown in FIG. 7, the second hollow part 41A and the tongue piece 42A are formed respectively in a pentagon shape; in the alignment structure 40B shown in FIG. 8, the second hollow part 41B is formed in a rectangle shape while the tongue piece 42B is shaped like a pentagon; and in the alignment structure 40C shown in FIG. 9, the second hollow part 41C is formed in a rectangle shape while the tongue piece 42C is shaped like an arc. With reference to the alignment structures 40, 40A, 40B, and 40C, it is noted that the alignment structures of the present disclosure can be formed in any shapes according to actual requirement and at will.

Moreover, there is no restriction relating to the means to be used for forming the first dentition 10, the second dentition 20, the connection structures 30, 30A, 30B and the alignment structures 40, 40A-40C on the strip 100, and thus they can be formed by stamping forming for instance. Accordingly, the indentation line 32 can be an indentation formed on the strip 100 by stamping on the strop 100 without penetration, the tongue piece 42 is formed by stamping and bending, and the other parts, such as those hollow parts, can be formed by stamping and cutting.

Figure 5:
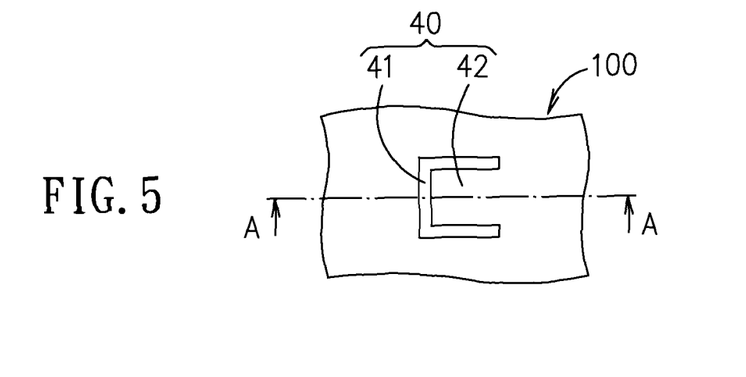
FIG. 5 is a schematic diagram showing an exemplary alignment structure used in the present disclosure.
Figure 6:
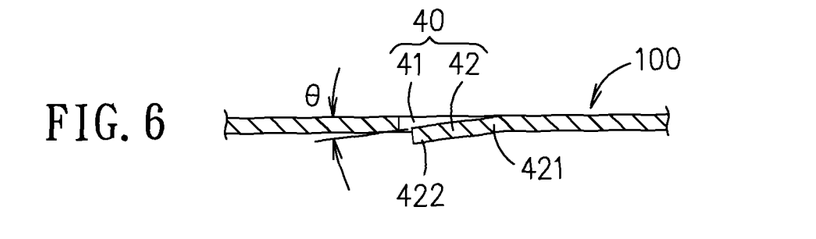
FIG. 6 is an A-A sectional view of FIG. 5.
Figure 9A:
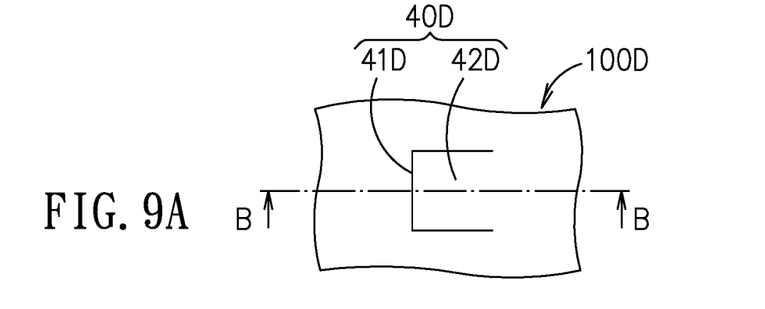
FIG. 9A is a schematic diagram showing the through portion of an exemplary alignment structure of the present disclosure.
Figure 9B:
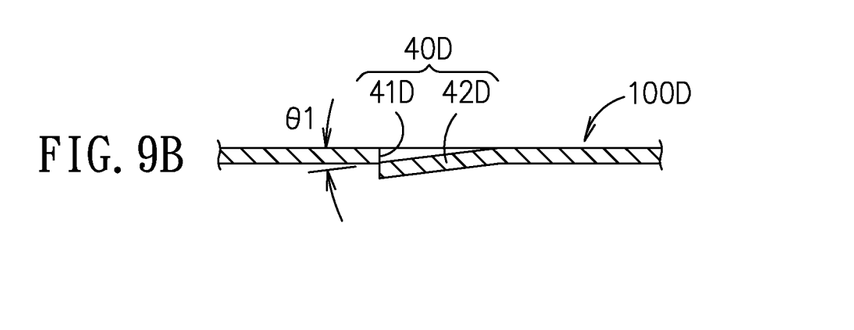
FIG. 9B is a B-B sectional view of FIG. 9A.
Figure 9C:
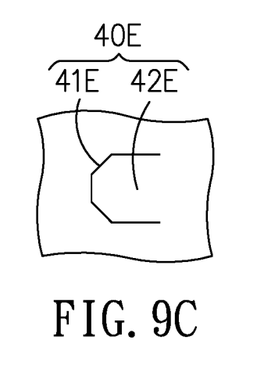
FIG. 9C and FIG. 9D are schematic diagrams showing various through portions of different exemplary alignment structures of the present disclosure.
Figure 9D:
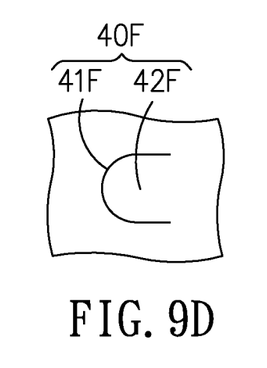

Please refer to FIG. 9A and FIG. 9B, which are schematic diagrams showing the through portion of an exemplary alignment structure of the present disclosure. IN the embodiment shown in FIG. 9A and FIG. 9B, Each of the plural alignment structures 40D formed on the strip 100D is composed of a groove 41D and a toe piece 42D, in which the toe piece 42D is arranged sticking out of one surface of the strip 100D, and thus enable an included angle $\theta_1$ to be formed between the toe piece 42D and the strip 100D. It is noted that groove 41D in this embodiment is used for acting exactly as the second hollow part 41 that is shown in FIG. 5, and thus the toe piece 42D is acting as the tongue piece 42 of FIG. 5, however, the embodiment shown in FIG. 9A and FIG. 9B is different than the one shown in FIG. 5 in that: only a portion of the groove 41D is formed boring and penetrating through the strip 100D, and the periphery of the toe piece 42D is not separated from the strip 100D, but still remain connecting to the strip 100D. That is, if the alignment structures are produced by a stamping process, the stroke of the stamping process should not be larger than the thickness of the strip 100D so that three can be grooves 41D instead of hollowed slots that are being cut and formed on the strip 100D. Please refer to FIG. 9C and FIG. 9D, which are schematic diagrams showing various through portions of different exemplary alignment structures of the present disclosure. In FIG. 9C, each of the grooves 41E is formed in a pentagon shape and each toe piece 42E as well, and in FIG. 9D, each of the grooves 41F is formed like an arc and each toe piece 42F as well.

Figure 10:
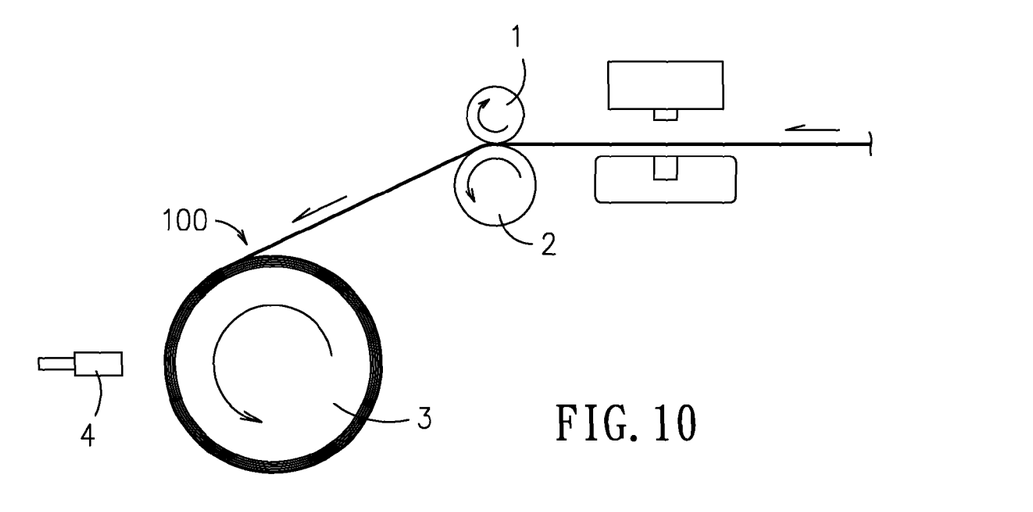
FIG. 10 is a schematic diagram showing a system for spirally winding a strip in the present disclosure.
Figure 11:
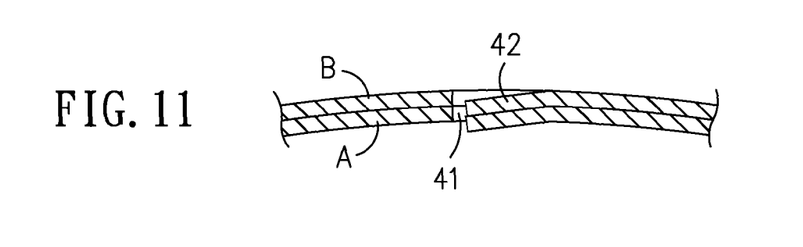
FIG. 11 and FIG. 12 are schematic diagrams showing the interlocking of the alignment structures that are disposed respectively at two different layers in a spirally wound stator core of the present disclosure.
Figure 12:
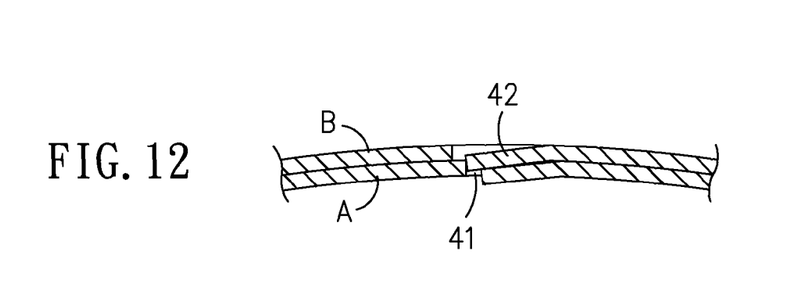

Please refer to FIG. 10, which is a schematic diagram showing a system for spirally winding a strip in the present disclosure. In FIG. 10, the strip 100 is fed to be pressed by two rollers 1 and 2 so as to be spirally wound upon a shaft 3 while allowing the free ends of the tongue pieces 42 of FIG. 6 to stick out of the strip's surface that is arranged facing toward the shaft 3. As shown in FIG. 10, the strip 100 can be wind onto the shaft 3 in a layer-by-layer manner. Please refer to FIG. 11, which is a schematic diagram showing the interlocking of the alignment structures that are disposed respectively at two different layers in a spirally wound stator core of the present disclosure. It is noted that for any on of two neighboring layers in the spirally wound strip 100, there are at least one of the plural alignment structures 40 to be disposed thereon while allowing the alignment structures 40 on one layer to be arranged at positions corresponding the alignment structures 40 on its neighboring layer. As shown in FIG. 11, during the spiral-winding of the strip 100, the inner layer A, i.e. the bottom layer of FIG. 11, is being bended into an arc, by that the second hollow part 41 on the inner layer A will be forced to expand a little, and thereafter when the outer layer B, i.e. the top layer, is forced by a tension to engage with the inner layer A, the tongue pieces 42 of the alignment structures 40 on the outer layer B will be forced to inset into the second hollow parts 41 of the alignment structures 40 on the inner layer A. Thereafter, since the shaft 3 is being driven to rotate continuously, the tongue pieces 42 of the outer layer B will be driven by the force induced from the shaft rotation so as to abut tightly against the second hollow parts 41 of the inner layer A, and thereby, there will be no gap existed between neighboring layers in the so-achieved stator core, and also there is no need to exert any pressure on the stator core for forcing layers in the stator core to keep attaching to one another with good alignment. As to the outermost layer of the stator core as well as the innermost layer, they can be fixed either by laser welding using a laser means 4 disposed at a side of the shaft 3, or by the use of an adhesive. It is noted that during the spirally winding of the strip 100, such welding or adhering can be performed at other portions of the strip 100 and are not restricted to the outermost layer and the innermost layer.

Figure 13:
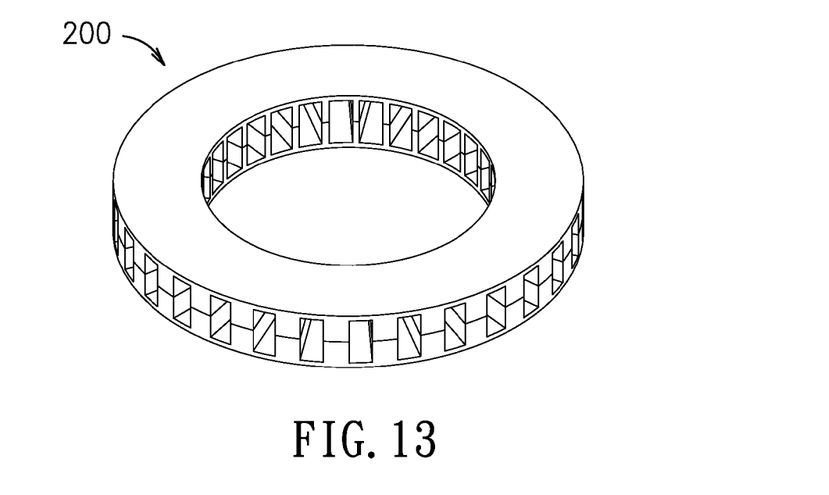
FIG. 13 is a three-dimensional diagram showing an exemplary stator core of the present disclosure.
Figure 14:
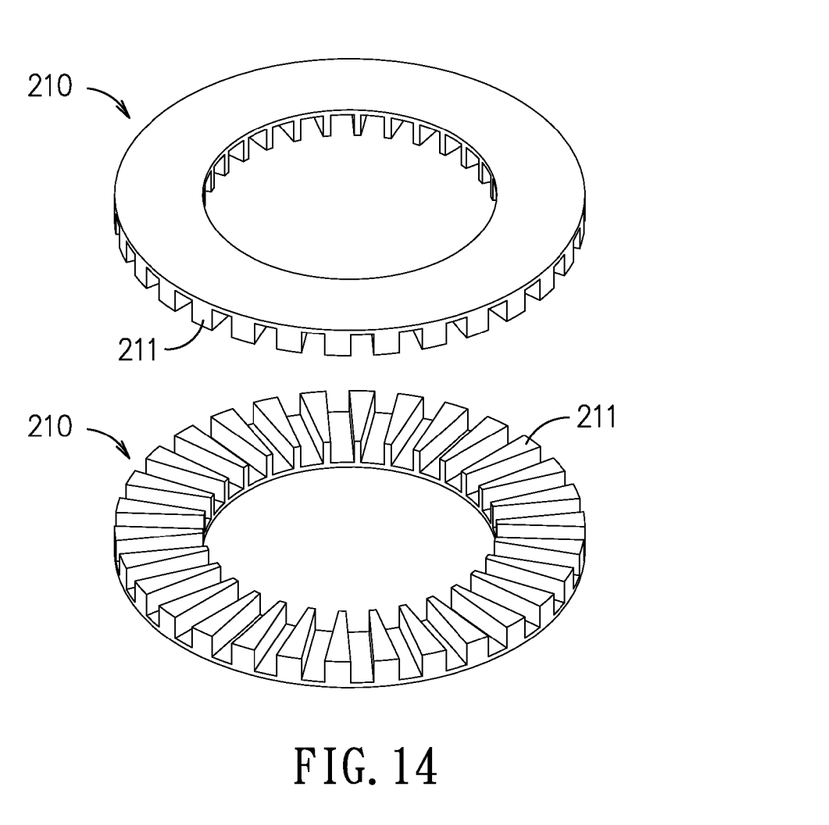
FIG. 14 is a three-dimensional diagrams showing two stators formed from the separation of the stator core of FIG. 13.
Figure 15:
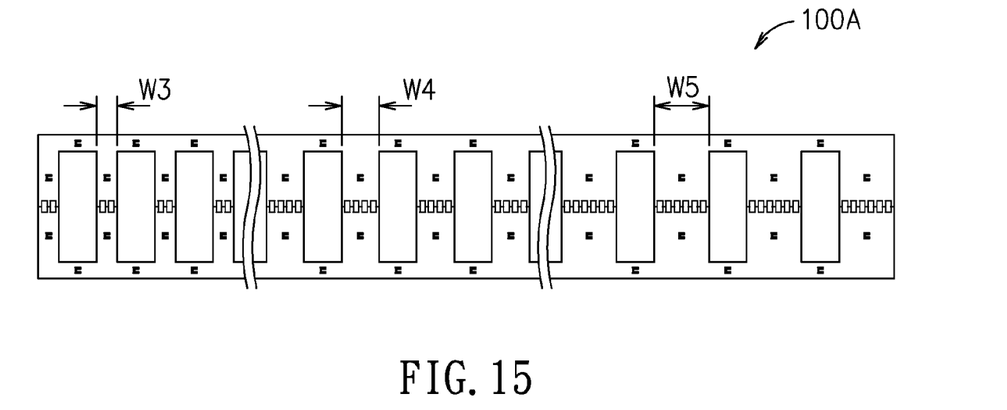
FIG. 15 is a schematic diagram showing an exemplary strip for forming the stator core of FIG. 13.

Please refer to FIG. 13, which is a three-dimensional diagram showing an exemplary stator core of the present disclosure. The stator core of the present disclosure is formed from a strip 100 that is being spirally wound, as show in FIG. 1. By the spiral winding of the strip 100, a multi-layered circular-block-like stator core 200 can be achieved, as shown in FIG. 13. Thereafter, by the exerting of an external force upon the stator core 200, the stator core 200 can be split and divided from the middle thereof into two stators 210 with the same geometrical characteristics, as shown in FIG. 14. In FIG. 14, each of the two stator 210 is formed with an array of fan-like teeth 211, that can be achieved by the design of varying teeth width in the strip 100, as the embodiment shown in FIG. 15. In FIG. 15, a symmetrical double-row mirroring teeth set design of continuous variable pitch is applied on the strip 100A, by that from the left to right, the widths between any two neighboring teeth in strip 100A is ever widening that for instance, the fifth width W5 is larger than the fourth width W4, and the fourth width W4 is larger than the third width W3. Thus, the strip 100A after being spirally wound in the way shown in FIG. 10, a stator core 200 of FIG. 15 can be achieved. According to the embodiments shown in FIG. 1 and FIG. 15, it is noted that the teeth formed on the stator of the present disclosure can have different shapes whereas the shape of the teeth is determined by the various width designs of the strip.

Figure 16:
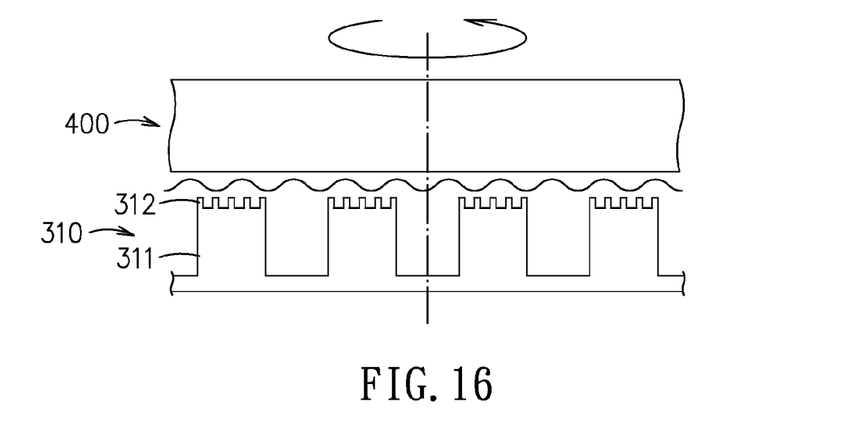
FIG. 16 is a schematic diagram showing the structural relationship between a rotor and an exemplary stator of the present disclosure.

In the stator core of the present disclosure, there are connection structures being formed at positions respectively between the first dentition and the second dentition, as the connection structures 30 shown in FIG. 2. Accordingly, the connection structures can be broken by an external force exerting on the spirally wound stator core, so that the stator core is split and divided into two stators with the same geometrical characteristics, and in some case, it is possible to form a comb-like structure on the tip of each tooth, as shown in FIG. 16. In FIG. 16, there is a comb-like structure, that is composed of a plurality of sub-teeth 311, to be formed on the tip of each tooth 311 of the stator 310, and as the comb-like structure with the plural sub-teeth 312 is orientated facing toward the rotor 400, the air-gap flux density distribution between the rotor 400 and the stator 310 can be adjusted by the formation of the comb-like structure. That is, by the formation of the connection structure, not only the first dental part of the first dentition is connected to the second dental part of the second dentition, but also the air-gap flux density distribution can be adjusted and determined. It is noted that there is no restriction relating to the size of the sub-teeth 312, but basically it can be designed according to the width between teeth and the dimension of the first hollow parts, as those 31, 31A and 31B shown in FIG. 2 to FIG. 5.

Figure 17:
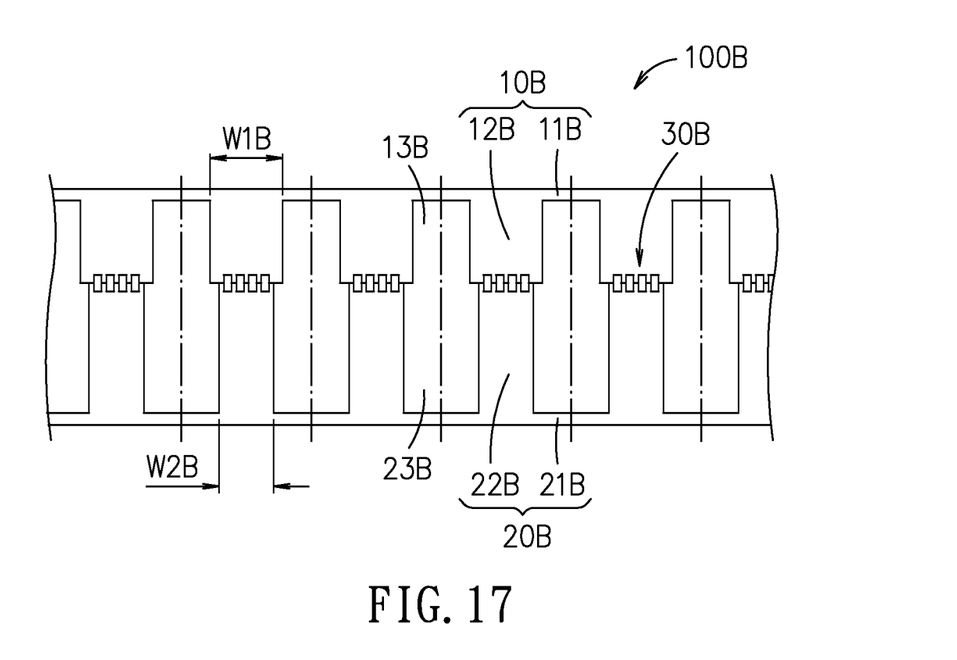
FIG. 17 is a schematic diagram showing a thin strip that is to be spirally wound into a stator core according to another embodiment of the invention.
Figure 18:
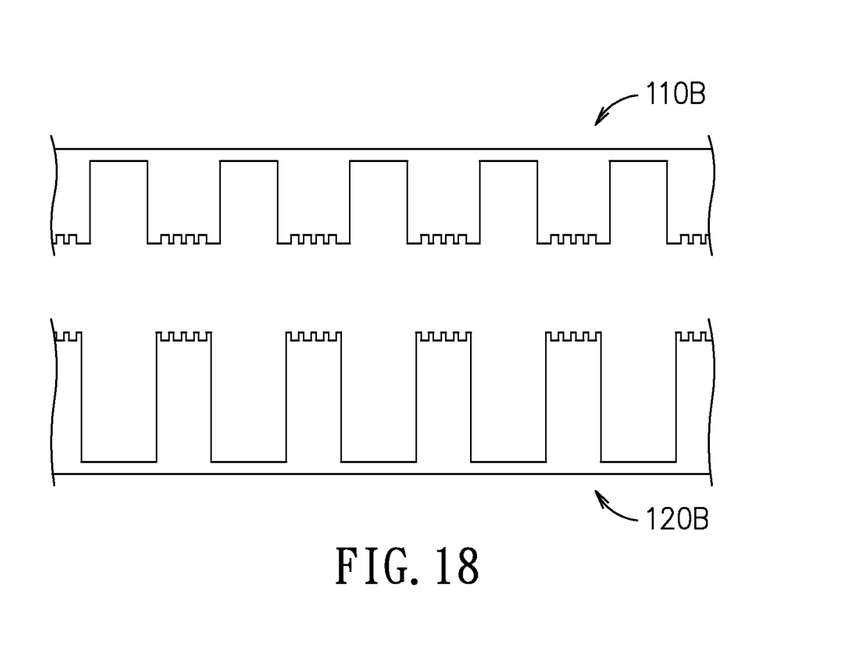
FIG. 18 is a schematic diagram showing two stators formed from the separation of the stator core of FIG. 17.

Please refer to FIG. 17, which is a schematic diagram showing a thin strip that is to be spirally wound into a stator core according to another embodiment of the invention. In FIG. 17, the strip 100B is formed with a first dentition 10B and a second dentition 20B, in which the first dentition 10B is featured by a first slot-number ratio and is composed of a first side 11B and a plurality of first teeth 12B in a manner that the plural first teeth 12B are arranged as an array on the first side 11B while allowing a plurality of slots 13B to be formed respectively between any two neighboring first teeth 12B; and similarly, the second dentition 20B is featured by a second slot-number ratio and is composed of a second side 21B and a plurality of second teeth 22B in a manner that the plural second teeth 22B are arranged as an array on the second side 21B while allowing a plurality of slots 23B to be formed respectively between any two neighboring first teeth 22B. Since the second slot-number ratio of the second dentition 20B is equal to the first slot-number ratio of the first dentition 10B, thus the plural first teeth 12B are arranged corresponding to the plural second teeth 22B in a one-by-one manner. Moreover, there are connection structures 30B being formed at positions respectively between the first dentition and the second dentition for connecting the first teeth 12B to their corresponding second teeth 22B. In addition, each first tooth 12B is formed in a first teeth width W1B, and each second tooth 22B is formed in a second teeth width W2B, whereas the second teeth width W2B is larger than first teeth width W1B. After a stator core similar to the one 200 shown in FIG. 13 is formed by the spiral winding of the strip 100B, the stator core 200 can be split and divided into two stators 110B and 120B by the exerting of an external force upon the connection structures 30B for enabling the first dentition 10B to separate from the second dentition 20B, as shown in FIG. 18. In FIG. 18, the stator 110B is featured by a first teeth width W1B which is different from the second teeth width W2B of the stator 110B. As disclosed in the embodiments shown in FIG. 1 and FIG. 18, for the spirally wound stator core of the present disclosure, no matter its first dentition and the second dentition are symmetrically designed or asymmetrically designed in structure and in arrangement, only if the second slot-number ratio of the second dentition is equal to the first slot-number ratio of the first dentition or allowing the plural first teeth to be arranged corresponding to the plural second teeth respectively in a one-by-one manner, the spirally wound stator core can be split and divided into two stators.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:
1. A wound stator core, being formed from a spirally piled strip, wherein the strip comprises:
 a first dentition, featured by a first slot-number ratio, and composed of a first side and a plurality of first teeth in a manner that the plural first teeth are arranged as an array on the first side; and
 a second dentition, featured by a second slot-number ratio, and composed of a second side and a plurality of second teeth in a manner that the plural second teeth are arranged as an array on the second side; while allowing each second tooth to be connected to one corresponding first tooth;
 wherein, each first tooth is formed with a first dental part at an end thereof opposite to the end thereof that is connected to the first side, while similarly each second tooth is formed with a second dental part at an end thereof opposite to the end thereof that is connected to the first side, and each first tooth is connected to the second dental part of its corresponding second tooth by the first dental part thereof.
2. The wound stator core of claim 1, further comprising:
 a plurality of connection structures, each being formed at a position between one of the plural first dental parts and its corresponding second dental part, and each being composed of a plurality of first hollow parts that are arranged in an array parallel to a longitudinal direction of the strip.

3. The wound stator core of claim 2, further comprising:
an indentation lines, formed extending in a longitudinal direction parallel to the longitudinal direction of the strip while passing through the joints between the first dental parts and their corresponding second dental parts, and also passing through the centers of all the plural first hollow parts.

4. The wound stator core of claim 3, wherein each of the plural first hollow parts is constructed in a shape symmetrically with respect to the indentation line that is disposed passing through the centers of the first hollow parts.

5. The wound stator core of claim 1, wherein each of the plural first teeth is formed with a first width and each of the plural second teeth is formed with a second width, and the first width is equal to or not equal to the second width.

6. The wound stator core of claim 1, wherein the strip includes a plurality of alignment structures, and each alignment structure further comprises:
a second hollow part, formed boring through the strip; and
a tongue piece, arranged inside the second hollow part, formed with a connect side and a free side that are opposite to each other to be used for allowing the tongue piece to connect to the strip via the connect side while enabling the free side to hang and stick out of one surface of the strip, and thus enabling an included angle to be formed between the tongue piece and the strip.

7. The wound stator core of claim 6, wherein for any on of two neighboring layers in the spirally wound strip, there are at least one of the plural alignment structures to be disposed thereon while allowing the alignment structures on one layer to be arranged at positions corresponding the alignment structures on its neighboring layer, and for any two such alignment structures that are disposed respectively on different layers at corresponding positions, they are arranged for allowing the tongue piece of one of the two alignment structure to extend into the second hollow part of another alignment structure.

8. The wound stator core of claim 7, wherein the strip is being spirally wound around a shaft into a multi-layered core centering the shaft, while allowing the free end of each tongue piece to stick out of a surface of the strip that is arranged facing toward the shaft.

9. The wound stator core of claim 1, wherein the strip includes a plurality of alignment structures, and each alignment structure further comprises:
a groove, having a portion thereof being formed penetrating the strip; and
a toe piece, arranged inside the groove, coupled to the strip by the periphery thereof so as to enable the toe piece to stick out of one surface of the strip, and thus enable an included angle to be formed between the toe piece and the strip.

10. The wound stator core of claim 1, wherein the strip is an electric magnetic steel sheet.

* * * * *